W. H. KEITER.
STEERING GEAR.
APPLICATION FILED APR. 11, 1910.
1,053,403.
Patented Feb. 18, 1913.
3 SHEETS—SHEET 1.
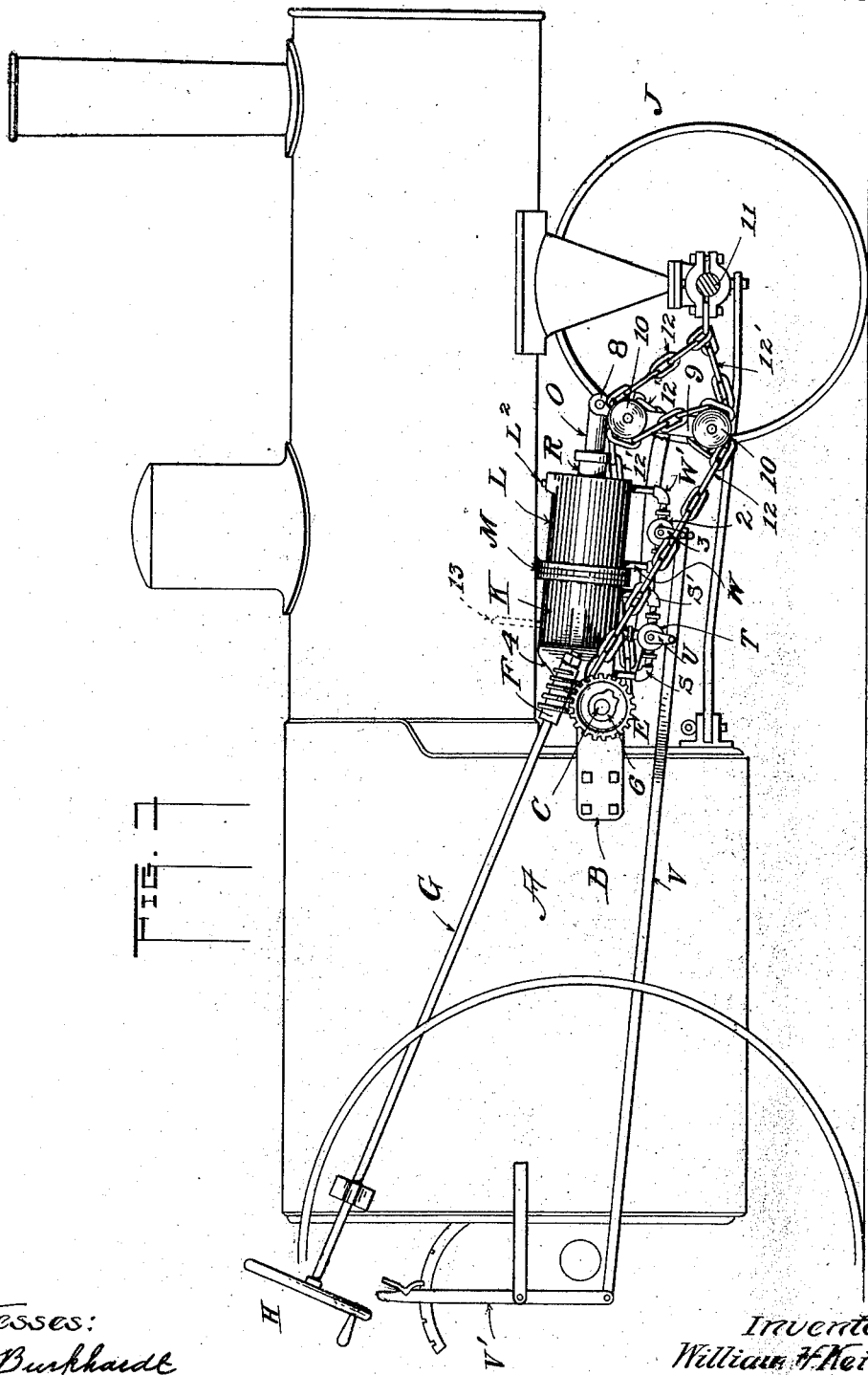
Witnesses:
G. C. Burkhardt
W. G. Scott
Inventor:
William H. Keiter,
By L. M. Thurlow,
Atty.

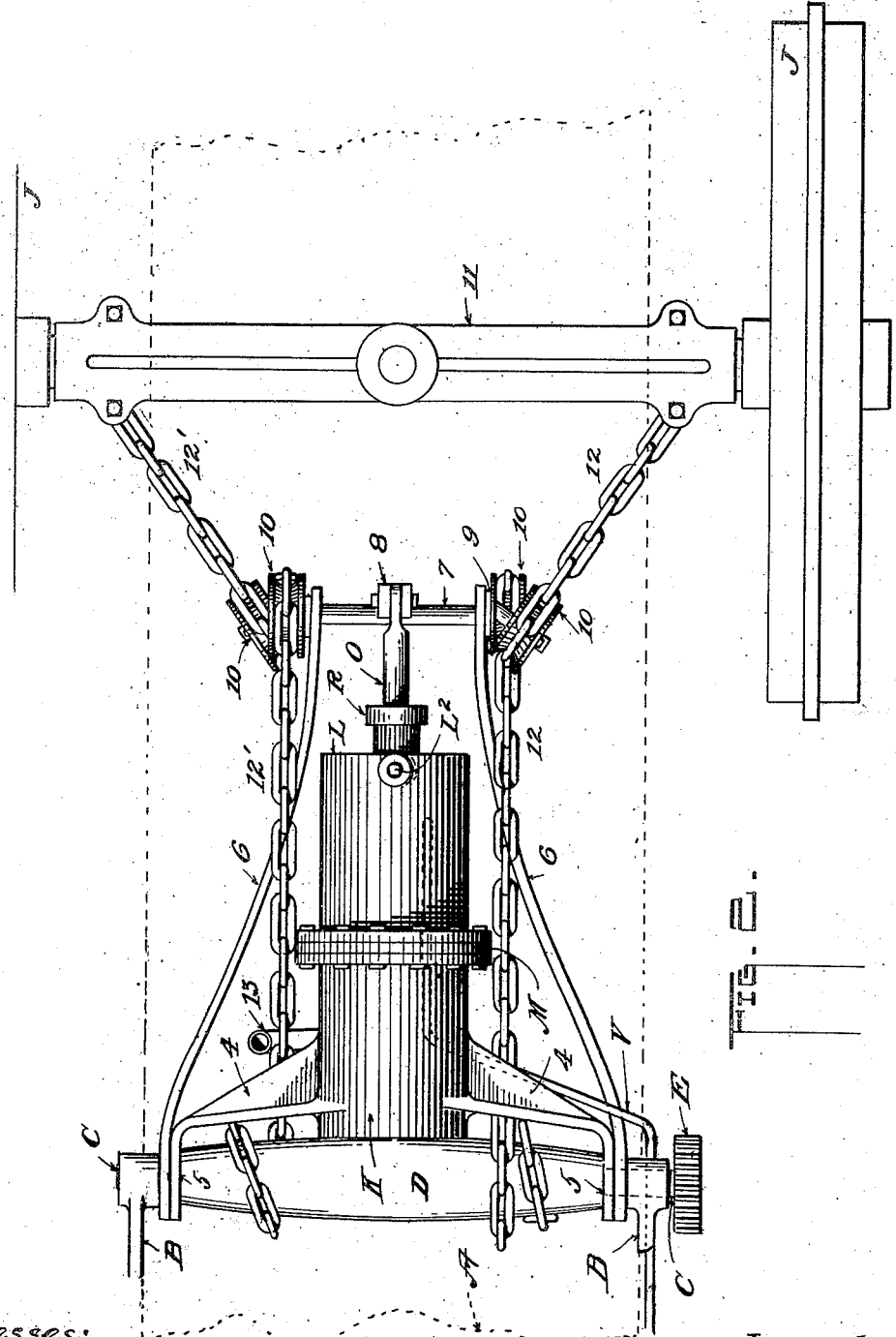

W. H. KEITER.
STEERING GEAR.
APPLICATION FILED APR. 11, 1910.
1,053,403.
Patented Feb. 18, 1913.
3 SHEETS—SHEET 3.
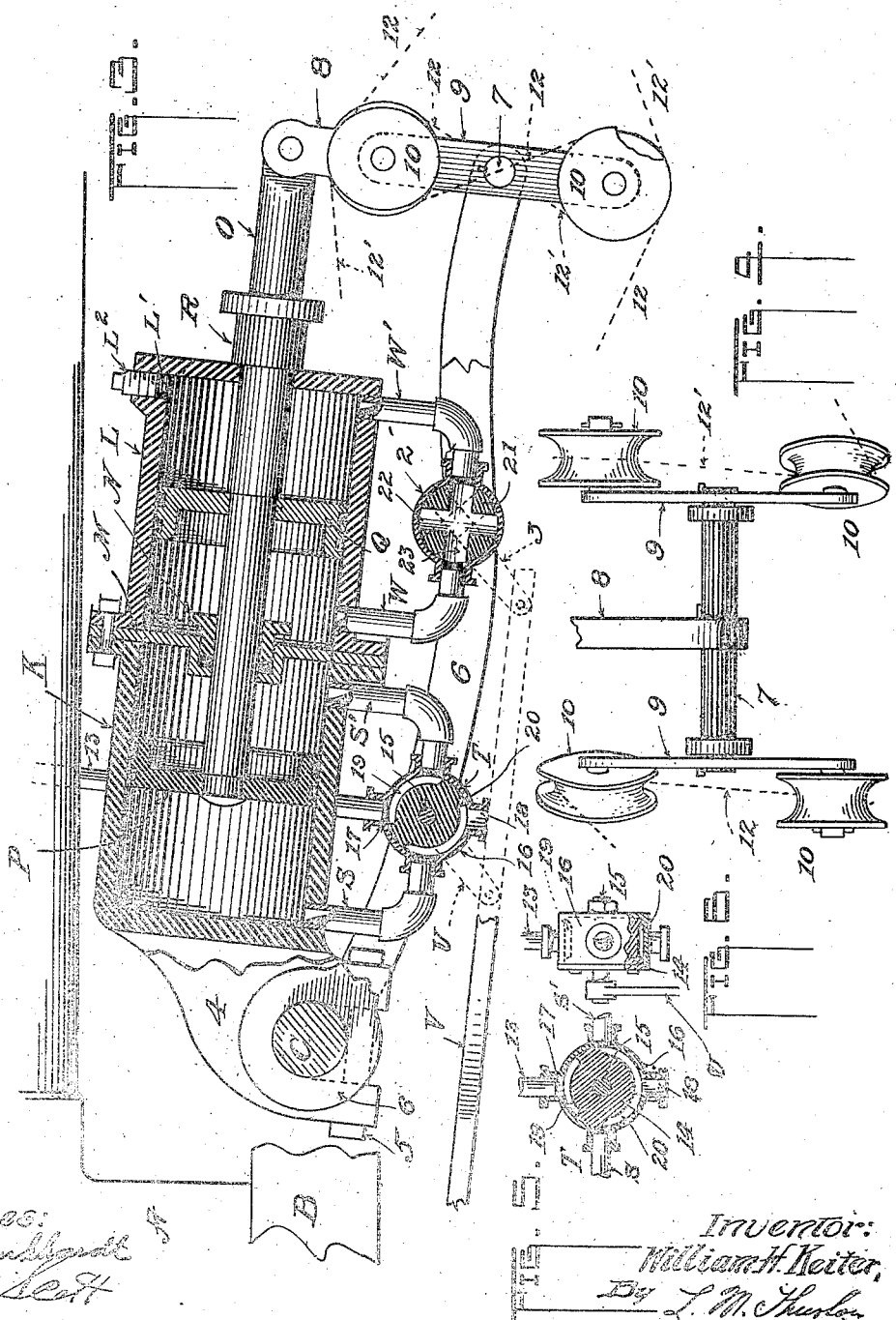

UNITED STATES PATENT OFFICE.

WILLIAM H. KEITER, OF PEORIA, ILLINOIS.

STEERING-GEAR.

1,053,403. Specification of Letters Patent. Patented Feb. 18, 1913.

Application filed April 11, 1910. Serial No. 554,868.

*To all whom it may concern:*

Be it known that I, WILLIAM H. KEITER, a citizen of the United States, residing at Peoria, in the county of Peoria and State of Illinois, have invented certain new and useful Improvements in Steering-Gear; and I do hereby declare that the following is a full, clear, and exact description of the invention, which will enable others skilled in the art to which it appertains to make and use the same.

This invention pertains to steering apparatus and relates more particularly to the steering gear of traction engines that can be operated by steam or air pressure.

The primary object of the invention is to provide a steering gear that may be operated by steam or other pressure whereby to relieve the operator of considerable labor and also to make the steering operation a quick one though having the mechanism under perfect control.

A further object is to provide a steering gear operated by pressure against a piston and provide in conjunction therewith an automatic lock for such gear when the pressure is removed.

Another object is to provide a steering gear which includes a piston operated by steam or air pressure and controlled by a fluid inclosed within a cylinder which constitutes a lock for the steering gear when the steam or air pressure is removed.

Another object is to provide a piston operated by steam or air pressure, a piston controlled by a fluid, a valve for controlling the steam, and a valve to control the fluid.

A further object is to provide a cylinder of two compartments, a piston for each and a piston-rod extending into both compartments to carry said pistons, one of the latter being operated by a gas, the other controlled by an imprisoned fluid.

Other objects will appear in the accompanying specification and although the invention is susceptible of various changes it is shown in one of its preferred embodiments in the accompanying drawings in which:—

Figure 1 is a side elevation of a traction engine showing my invention attached thereto. Fig. 2 is a plan of a portion of the engine and my invention. Fig. 3 is a vertical longitudinal section of a cylinder constituting parts of my steering apparatus. Fig. 4 is a front elevation of part of the steering mechanism. Fig. 5 is a vertical section of a steam valve, and Fig. 6 is a side elevation of the same in part section.

An advantage of my steering gear is that it is designed as an attachment for a traction engine and said engine does not require rebuilding or a rearrangement of its parts in order to adapt it for the reception of the invention, the attachment being so constructed that it may be placed upon almost any make or type of engine with but little work.

Secured to the boiler of the engine A are the usual brackets B for supporting the trunnions C of the usual winding-drum D there also being the usual worm-wheel E on the latter and a worm F carried by a shaft G on which is the steering wheel H this all being common to traction engines and although the winding drum is not necessary to the operation of my steering gear, and is not a part of my invention, it is shown and may be used at any time for steering purposes without being interfered with by my structure.

A cylinder of two portions indicated by K and L separated by a central dividing wall or head M, Fig. 3, is located beneath the boiler behind the steering wheels J. Merely for convenience in constructing it the cylinder is made of the two portions mentioned their adjacent ends being "faced off" with the said head M clamped between them. Said head is provided with a stuffing box N through which extends a piston-rod O terminating at one end within the cavity of the cylinder-portion K and provided with a piston-head P in said cavity. Said rod also has a piston-head Q within the portion L of the cylinder and the free end of the rod extends through the forward end of the cylinder and a stuffing box R. The ends of the cylinder cavity having the piston head are connected through a pipe having two branches S and S' between which a valve T is interposed having an arm U attached to a shifting valve-rod V Fig. 1 operated by a lever V'. The ends of the cavity of the cylinder portion L are connected in the same manner through a pipe of two branches W and W' between which is interposed a valve 2 provided with a valve arm 3 lying parallel to the arm U and attached to the valve-rod V mentioned but the structure of these valves will be explained after describing the other portions of the apparatus. At the rear of the cylinder L, K, are two lugs 4 which, as shown in Fig. 3, are preferably bifurcated and adapted, for instance, to be dropped upon and inclose the trunnions C of the winding drum D. A bolt 5 extends through the bifurcated end and serves to hold the cylinder in place at that end but permits it to tilt. As mounted the cylinder lies centrally beneath the boiler and is permitted to have a short vertical movement due to the connection of the piston-rod O with one of the steering parts now to be described.

The numeral 6 indicates two side rods or braces which also may be mounted at their rear ends, for instance, on the trunnions C, their free ends extending somewhat forward of the cylinder and carried between them in a rigid manner is a short shaft 7 having fixed at its middle an upright arm 8 to whose upper end the piston-rod O is pivotally attached. At each extremity of said shaft is fixed a vertically disposed cross-arm 9 having at each end a pulley or sheave 10. The front wheel-axle is denoted by the numeral 11 having at the usual places, near its ends, means to which the steering chains 12 and 12' are connected. One of the latter extends rearward and upward, as in Figs. 1 and 2, over one of the upper sheaves and then downward and forward over the lower sheave, its end being attached to the winding drum D. The opposite chain extends downward and rearward under the lower roller of the other cross-arm 9, thence upward and forward over the sheave above it, thence to and upon the winding drum, this said chain being wound upon said drum in an opposite direction from that in which the other chain is wound; but this method of winding is customary in steering devices, I merely having described it to show that I make no change in the structure of the engine and its parts, there being only the slightly different disposition of the chains in running them over the sheaves. And in using my steering gear the winding drum has no movement whatever the rear attached ends of the chains having a fixed position.

In the reciprocations of the piston rod the cross arms 9 through the arm 8 and shaft 7 are rocked forward or backward. Now, since the chains extend from the wheel axle over the pulleys in opposite directions it follows that the rocking movement of the arm in one direction will tend to shorten the distance between the attached ends of one of the chains and permit the distance between the ends of the other to increase. For instance, if the arm 9 in Fig. 3, is moved so as to carry its upper sheave backward and the lower one forward, both ends of the chain 12 indicated by the broken lines will be drawn upon and cause a simultaneous reverse direction of movement for the oppositely wound chain 12', which will slacken in exact proportion to which the first is tightened. The result is, therefore, that the wheel axle will be swung in the direction desired depending, of course, upon the direction of movement of the piston or upon the direction in which the chains are wound upon the sheaves. The arms 6 receive the thrust or pull, as the case may be, incident to the steering operation and the cylinder may tilt to the extent necessary due to the small arcuate movement of the arm 8 although the cylinder and the said arm may tend to rock together the tension of the chain serving to support the members in position. If at any time, however, it is desired to use the steering wheel H that member will move the chains around their several sheaves—the steering being accomplished in the usual way.

The manner of imparting movement to the piston will now be described. The valve T is a four-way valve and connected to it is a pipe 13 for the supply of steam or compressed air and said valve is made somewhat in the same form as the common "plug-valve" the movable portion being indicated by the numeral 14 which is mounted on a stem 15 to which the valve-arm U, before described, is attached. This member 14 is inclosed in a casing 16 having an inlet opening 17 for the steam and an outlet for the exhaust at 18, and at opposite sides of the casing the pipe branches S and S' are connected. In the periphery of the member 14 are two grooves 19 and 20 the former being arranged so that it will connect the steam pipe 13 with either of the side openings leading to the pipe S S'. The groove 20 is also of such an extent that it will connect one of the last mentioned openings with the exhaust at 18, see Fig. 3. In the position shown in this figure, the valve having been swung by the movement of the valve-rod V the steam will pass from the pipe 13 through the groove 19 and the pipe S' into the end of the steam cylinder at the right of the piston P thus forcing said piston toward the left and the steam that may be in the cavity behind the piston will find its way through the pipe S, the groove 20 and the opening 18 of the valve. The valve 2 is also of the plug variety, by preference, and the movable member 21 therein is provided with two bores 22 and 23 extending entirely through it at right angles to each other. In the present instance the normal position of the valve when the gear is at rest is such that the said bores 22 and 23 occupy the position shown in dotted lines in Fig. 3. When, however, the steam valve is changed in position and lies as shown in the figure, one of the bores 22 and 23 is made to connect the two branches W and W' of the pipe so that one end of the cylinder L may communicate through said branches with the other end. This portion of the cylinder is filled with a fluid, preferably a heavy oil, which is supplied through an opening L' closed by a plug L². As the piston P moves toward the left the oil in the cylinder at the left will be forced through the valve 2 into the opposite end of the said cylinder and since the cylinder and the pipes and valves are entirely full of oil the movement of this fluid will result the moment the piston Q changes position in the slightest degree and it is evident that if the valve 2 is closed so that there is no communication between the two ends of the cylinder the piston Q will be absolutely prevented from moving regardless of the extent of pressure placed thereon through the piston-rod O, chains, and wheel axle. Both the valves T and 2 will be closed simultaneously since both valves are operated by the same member— the valve-rod V. A movement of the latter in one direction or the other will, of course, result in causing the steam to enter at one side of the piston P or the other and will always open the valve 2 for the movement of the oil and movement is thereby imparted to the wheel axle in the desired direction and the moment the steam is cut off the gearing is automatically locked through the piston Q by the imprisoned oil.

In bringing out my invention I desire to make it understood that I am aware that it is not new to steer by means of a steam operated device but I believe it is new to combine a steam pressure device with a fluid substantially in the manner shown and described whereby a perfect steering operation can be had with an automatic lock and especially by the particular and peculiar arrangement of the parts comprised in my steering gear.

Having thus described my invention, I claim:—

1. The combination with a steering mechanism, of a piston-rod having control of it, a cylinder having a wall dividing it into two entirely separate chambers having no communication with one another and having the piston-rod extending into both said chambers and through said wall, a piston secured on said rod at each side of the wall, there being a separate passage connecting the ends of each chamber, each said passage having communication only with its own chamber with which it is connected, and a valve in each passage.

2. The combination with a steering mechanism, of a cylinder having a wall separating it into two disconnected chambers, a piston-rod extending into both chambers and through said wall, a piston secured on said piston-rod in each chamber, there being a separate passage connecting the ends of each chamber at each side of the respective pistons, the same being entirely separate from the adjoining chambers, a valve in each passage, and means to operate them simultaneously.

3. The combination with a steering axle, of a piston-rod in control thereof, a cylinder having two non-communicating compartments into both of which the piston-rod extends, a separate pipe connecting the opposite ends of each compartment but each closed as to the opposite compartment, a valve in control of each pipe, and manually operated means in control of both valves.

4. The combination with a steering axle, of a piston-rod in control thereof, a cylinder having two non-communicating compartments into both of which the said piston-rod extends, a separate pipe connecting the opposite ends of each compartment but each closed as to the opposite compartment, a valve for each pipe, and means to operate the valves simultaneously.

5. The combination with a steering axle, of a piston-rod, a cylinder having two non-communicating compartments into both of which the said piston-rod extends, a pipe connecting the ends of one of the compartments, a valve in said pipe, a pipe connecting the ends of the other compartment and connected also with an outside pressure source, a valve in said pipe, said pipes each being closed as to the opposite compartment, and means to operate both the valves.

6. The combination with a steering axle, of a piston-rod, a cylinder having two non-communicating compartments into both of which the said piston-rod extends, a pipe connecting the ends of one of the compartments, and separate from the opposite compartment, a valve in said pipe, a pipe connecting the ends of the other compartment and connected also with an outside pressure source, and separate from the neighboring compartment, a valve in said pipe and manually operated means connected to both valves for operating them simultaneously.

7. The combination with a steering axle, of a member to impart movement thereto, a normally closed receptacle for a liquid having the member extending into it, a separate receptacle for receiving pressure and having the member also extending into it the said receptacle being non-communicating, there being a separate conduit for each receptacle to connect its ends, a valve in control of each conduit, and means to operate both valves simultaneously.

8. The combination with a steering axle, of a closed liquid containing cylinder having its ends connected by a passage, a valve in the passage, a cylinder adapted for receiving steam pressure and separated and closed from the other and having a passage connecting its ends, a valve in said passage, a member to impart movement to the axle and extending into both the cylinders, and means in control of both valves to operate them simultaneously.

9. The combination with the steering axle of a traction engine of a steam cylinder, a piston-rod therein adapted to impart movement to the axle, there being a passage connecting the ends of the cylinder, a valve therein to control the pressure admitted to the cylinder, a chamber separate from the cylinder and having a passage connecting its ends, a valve in said passage, a member in said chamber to control the piston-rod, and means in control of both valves.

10. The combination with a steering mechanism, of a member and a piston thereon in control of it, a closed cylinder containing an imprisoned liquid into which the member extends, a conduit connecting the ends of the cylinder, a valve in said conduit to control the movement of the fluid from one end of the cylinder to the other, a steam cylinder into which the said member extends, a piston in the latter, the said cylinder being entirely separate from the liquid cylinder, a conduit connecting the ends of the steam cylinder, a valve in the same, and means to operate both the valves simultaneously.

11. The combination with a steering-axle, of a power operated member to impart a steering movement thereto, a fluid containing receptacle closed within itself, a piston therein in control of the member and itself controlled by the fluid, a conduit connecting the ends of the said receptacle at each side of the piston, a valve in control of the said conduit, a receptacle for steam, a piston therein having connected relation with the first said piston, a conduit connecting the receptacle with itself at each side of the piston, a valve therein to control the entrance and escape of steam, and means to operate both the valves simultaneously.

12. In an apparatus of the character described, the combination with a steering-axle, of a cylinder for receiving external pressure and a cylinder for containing an imprisoned liquid, a piston for each cylinder, a piston-rod carrying both pistons and adapted to impart a steering movement to the steering-axle, the ends of the each cylinder being connected by a passage separate from each other and each separate from the other cylinder, a valve in control of each passage, and means to operate both valves simultaneously.

13. The combination with a steering-axle, of a rocking member, a support on which the member has a horizontal axis, means to rock the said member, and a chain attached to each end of the axle and extending over the member in opposite directions and secured rearward thereof, the member adapted in its rocking movements to shorten the distance between the ends of one of said chains.

14. The combination with a steering-axle, of a member adapted to rock on a horizontal axis and having an upper and lower extension, a support for the member, a chain attached to one end of the axle and extending over the upper and beneath the lower extension and secured rearward of the member, and a chain attached to the other end of the axle and extending under the lower extension and over the upper extension of the member and also secured rearward thereof, and means to rock the member.

15. In an apparatus of the character described, the combination with a steering-axle, of a support, a member to rock on said support on a substantially horizontal axis having an extension above and an extension below the axis of movement, a device connected to the latter at each extremity of the axle and extending over the member and fixed in position rearward of the same, and means to rock the member, said member adapted when tilted to shorten the distance between the ends of one of the devices.

16. In an apparatus of the character described, the combination with a steering-axle, of a support a member to rock on said support on a substantially horizontal axis, and having an extension above and below its axis, a device attached to each end of the axle, one of them extending over and beneath the upper and lower extension respectively, the other extending over and beneath the lower and upper extensions respectively and both secured in a fixed position at their rear ends, and means to rock the members.

17. In a steering-gear, the combination with a steering axle, of a cylinder having two compartments separated by a wall, a piston in each compartment, a piston-rod carrying both said pistons and in control of the axle, a separate pipe connecting the ends of each compartment, a valve in each pipe, and means connecting and simultaneously operating both valves.

18. In a steering-gear including a steering-axle, the combination of a cylinder having two compartments, a piston in each, a member to carry both pistons and adapted for controlling the axle, a pipe for each compartment for connecting the ends thereof, a valve in each pipe, and means to simultaneously operate both valves, one of the latter adapted for introducing pressure into the compartment with which it is in control.

19. The combination with the steering axle of a traction engine, of a steam cylinder and its piston mounted on the engine, a rocking member likewise mounted on the engine on a substatnially horizontal axis and having a part lying above and a part lying below its said axis, the piston having operative connection with said member to rock it, a valve to control pressure of steam to the piston, a chain attached to each end of the axle and extending in opposite directions over both the said parts of the member and attached to a fixed part of the engine rearward of the said member.

20. The combination with the steering axle and the chain-winding-drum of a traction engine, of a cylinder and its piston carried at one end on the engine, a support carried by the engine and having a member pivoted thereon with a part above and a part below its pivot and having the piston attached thereto, a chain attached to each end of the said axle and extending rearward in opposite directions, one of them passing over the upper extension and beneath the lower one, the other chain passing beneath the lower extension and over the upper one, both thence extending rearward to and upon said winding drum.

In testimony whereof I affix my signature, in presence of two witnesses.

WILLIAM H. KEITER.

Witnesses:
L. M. THURLOW,
AUGUSTA BURKHARDT.